(12) United States Patent
Adrain (10) Patent No.: US 10,918,181 B2
(45) Date of Patent: *Feb. 16, 2021

(54) CELL PHONE CASE

(71) Applicant: John B. Adrain, FrisSpokane, WA (US)

(72) Inventor: John B. Adrain, FrisSpokane, WA (US)

(*) Notice: Subject to any disclaimer, the term of this patent is extended or adjusted under 35 U.S.C. 154(b) by 33 days.

This patent is subject to a terminal disclaimer.

(21) Appl. No.: 16/537,187

(22) Filed: Aug. 9, 2019

(65) Prior Publication Data

US 2019/0357651 A1    Nov. 28, 2019

Related U.S. Application Data

(63) Continuation-in-part of application No. 16/020,685, filed on Jun. 27, 2018.

(60) Provisional application No. 62/527,476, filed on Jun. 30, 2017.

(51) Int. Cl.

| | |
|---|---|
| *B65D 85/00* | (2006.01) |
| *A45C 15/00* | (2006.01) |
| *B26B 1/08* | (2006.01) |
| *F41B 13/08* | (2006.01) |
| *F41C 9/00* | (2006.01) |
| *H04M 1/02* | (2006.01) |
| *H04B 1/3888* | (2015.01) |
| *F41C 33/00* | (2006.01) |
| *A45C 11/00* | (2006.01) |

(52) U.S. Cl.
CPC ............... *A45C 15/00* (2013.01); *B26B 1/08* (2013.01); *F41B 13/08* (2013.01); *F41C 9/00* (2013.01); *F41C 33/00* (2013.01); *H04B 1/3888* (2013.01); *H04M 1/026* (2013.01); *A45C 2011/002* (2013.01); *A45F 2200/0591* (2013.01)

(58) Field of Classification Search
CPC ... H01M 2/1094; H01M 2/1066; A45C 11/00; A45C 15/00; H04B 1/3888; B26B 1/02; B26B 11/006; B25F 1/04; H04M 1/21
USPC .............. 206/320; 524/116; 381/334; 705/44
See application file for complete search history.

(56) References Cited

U.S. PATENT DOCUMENTS

2012/0074006 A1 *   3/2012   Monaco ................. H04M 1/15
                                                              206/320

OTHER PUBLICATIONS

"Any Other Weapon (AOW): The NFA Catch-All", The Firearm Blog, Oct. 18, 2016, https://www.thefirearmblog.com/blog/2016/10/18/aow/.

"You can buy a handgun that looks like an iPhone, and cops are worried," BGR, Jan. 16, 2017, https://bgr.com/2017/01/16/ideal-conceal-iphone-like-gun/.

Web page for cell phone case at URL: https://www.realworldsurvivor.com/2015/12/30/prep-for-an-emergency-with-the-krudo-ktc54-cell-phone-case/ as shown on Feb. 21, 2020.

* cited by examiner

*Primary Examiner* — Phuoc H Doan
(74) *Attorney, Agent, or Firm* — Bodi Law LLC (57) ABSTRACT

A case for a communication device such as a cell phone, said case including a tool such as a weapon.

20 Claims, 9 Drawing Sheets

CELL PHONE CASE

CROSS-REFERENCES TO RELATED APPLICATIONS

This application is a continuation-in-part of U.S. application Ser. No. 16/020,685 filed on Jun. 27, 2018, which claims the benefit of U.S. Provisional Patent Application Ser. No. 62/527,476 filed on Jun. 30, 2017, all of which are incorporated herein by reference.

BACKGROUND

Cell phones are ubiquitous in modern society, and hence are carried nearly everywhere. Tools, such as knives, wrenches, screw drivers, etc. have proven to be useful for a number of different situations, and hence it is beneficial to have tools on one's person as often as possible. In particular, a tool such as a knife is useful for many purposes, not the least of which is self-defense. A firearm is also a useful tool for self protection. A new communication device case which combines a tool and a cell phone into a single package would be beneficial.

SUMMARY

Provided are a plurality of example embodiments, including, but not limited to, a cell phone case that provides a housing that incorporates a tool that can be deployed when desired, and retracted in other situations, where the case can be removed so that the tool is not taken into locations where such tools may be prohibited.

Also provided is a case for a communication device, comprising: a tool; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base. The base includes a tool receptacle configured to receive the tool and the deployment structure; and a switch is connected to the deployment structure, wherein the switch is configured to deploy the tool from the case upon activation of the switch.

Further provided is a case for a communication device, comprising: a tool; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base. The base includes a tool receptacle configured to receive the tool and the deployment structure, and the back portion includes a receptacle for receiving the tool and the deployment structure.

The above case also includes a cover for covering the receptacle to enclose the tool and the deployment structure within the receptacle of the back portion; and a switch connected to the deployment structure, wherein the switch is configured to deploy the tool from the case upon alternative activation of the switch.

Further provided is case for a communication device, comprising: a tool including a sharpened blade; deployment structure including at least one spring configured to provide a force to retract and/or deploy the tool; a front portion comprising an opening to access a screen of the communication device, the front portion having a peripheral frame around the opening and at least one opening to accommodate a speaker in the communication device; a back portion comprising a base and a frame surrounding a periphery of the base, wherein the base includes a tool receptacle configured to receive the tool and the deployment structure, wherein the back portion includes a receptacle for receiving the tool and the deployment structure; a cover for covering the receptacle to enclose the tool and the deployment structure within the receptacle of the back portion; a plurality of buttons on a side of the case each configured to actuate a different corresponding input device on the communication device; and a switch connected to the deployment structure, wherein the switch is configured to deploy and retract the tool from the case upon alternative activations of the switch.

Further provided is a case for a communication device, comprising: a weapon; deployment structure configured to activate the weapon; a front portion comprising an opening to access a screen of the communication device, said front portion having a peripheral frame around said opening and at least one opening to accommodate a speaker in the communication device; a back portion comprising a base and a frame, wherein said base includes a portion configured to receive said weapon and said deployment structure.

Also provided any of the above cases where the tool/weapon is a knife and/or a firearm. Further provided is a method of installing a phone in any of the above cases. In addition is provided any of the above cases where the communication device is a cell phone.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Provided is a cell phone case that has a deployable tool, such as a double action switch blade, built in. The phone can be removed from the case for taking with the user when the user travels in a secured region, such as by commercial air. Alternatively, the tool portion may be removable keeping the phone in a case portion during travel. The tool can be provided with bolt cut outs in the toll so that the tool can be used as an emergency wrench, and additional features could be provided to use it as other tools, such as providing a screw driver, or bottle opener function, for example.

Figure 4:
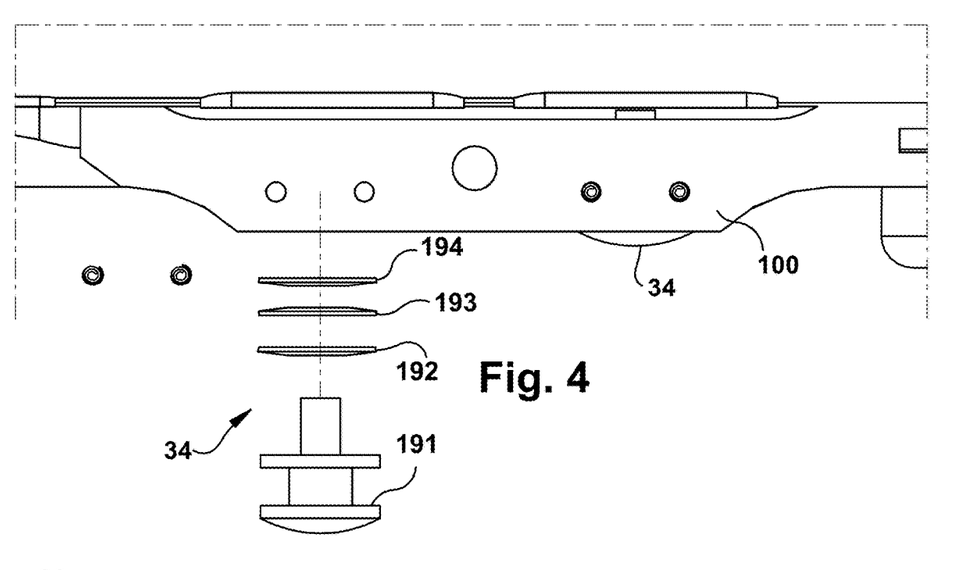
FIG. 4 is schematic showing example structure for a control button of the example case of FIG. 1.
Figure 5:
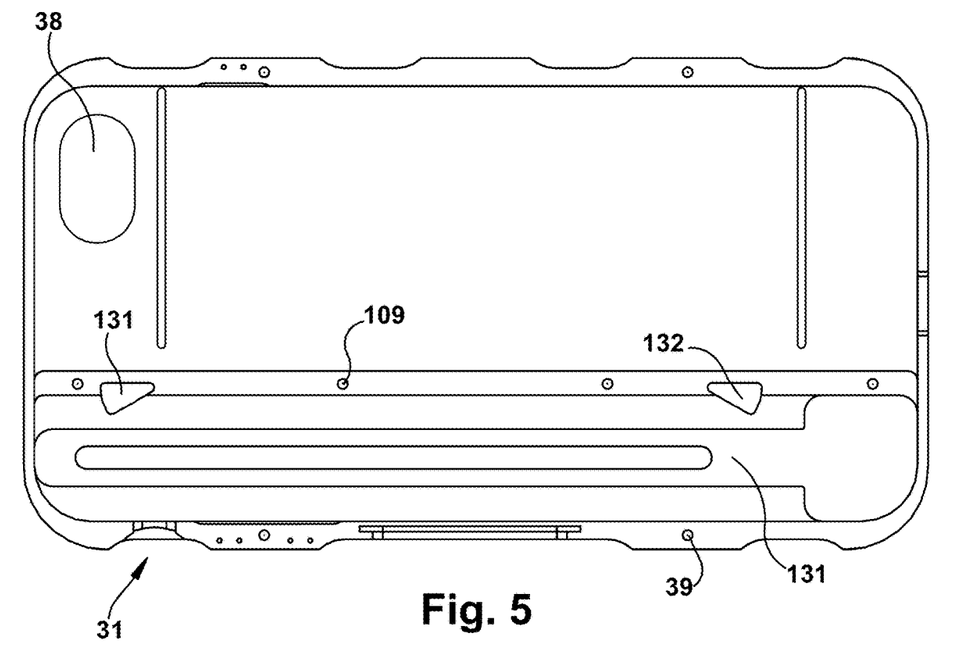
FIG. 5 is a schematic showing an example base of the example case.
Figure 6A:
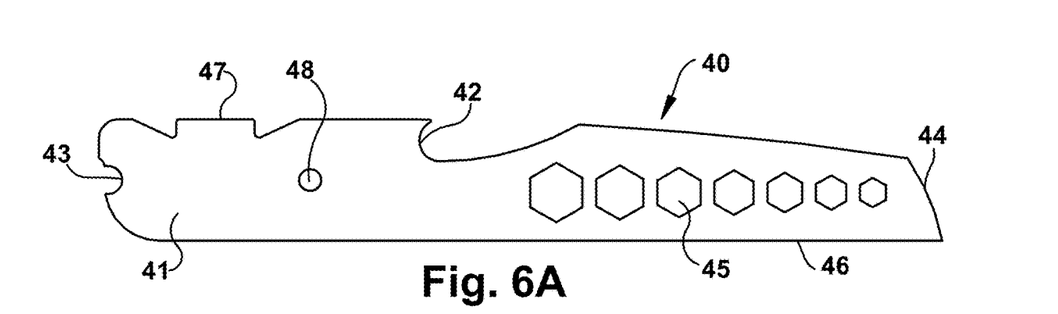
FIG. 6A shows a first example tool for use with any of the example cases.
Figure 6B:
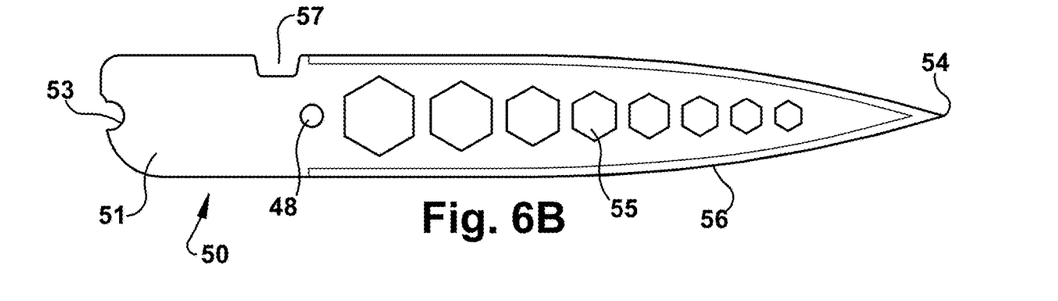
FIG. 6B shows a second example tool for use with any of the example cases.

FIGS. 1-5 are schematic drawings showing first example embodiments of a case with two different types of example tools in FIGS. 6A and 6B, and FIGS. 7-8 show another example embodiment with one of the example tools of FIG. 6B. FIGS. 9A, 9B, 10A, and 10B show an embodiment where the tool is a firearm. Other possible tools include a comb, screwdriver, pliers, bottle opener, hex wrench, nail file or nail clipper, scissors, pick, or any other useful type of tool. Furthermore, the tools may be interchangeable, such that a user can change out one type of tool for another type of tool. In addition, multiple tools might be provided such as in a Swiss army knife.

Figure 1:
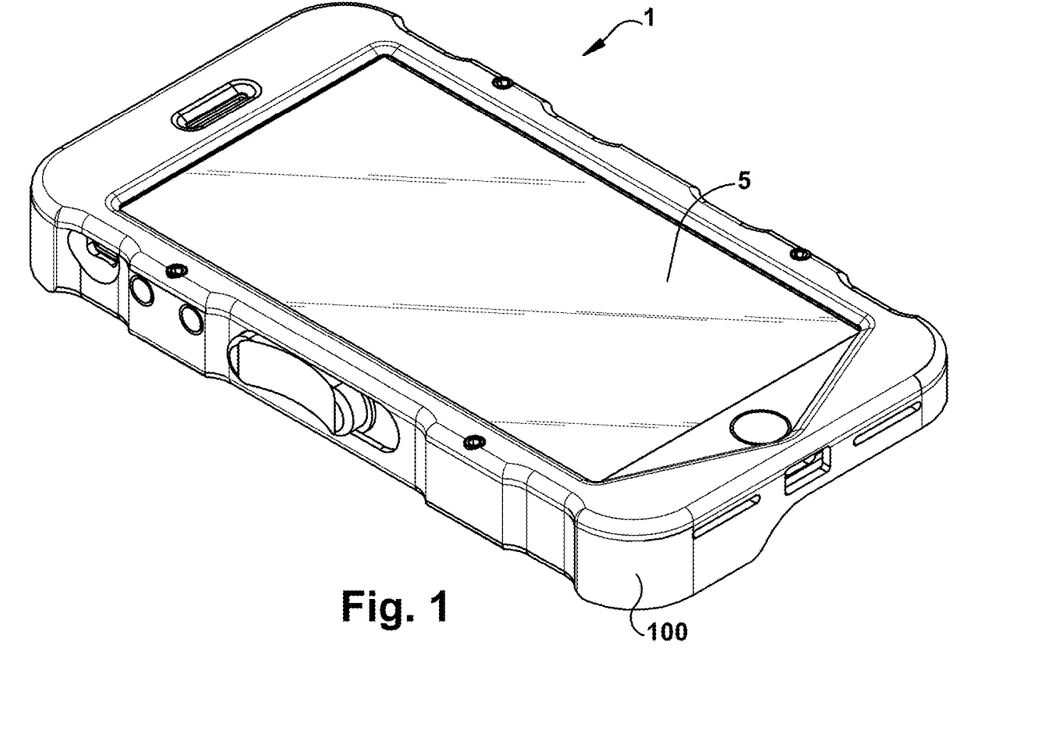
FIG. 1 shows a schematic of a perspective view of a front of an example cell phone tool case system.

FIG. 1 shows a schematic of a perspective view of the front of an example assembled system 1 including a cell phone 5 installed in an example case 100. Note that the device looks much like a typical cell phone and case combination, but might be slightly thicker than a traditional case to accommodate the tool portion.

Figure 2:
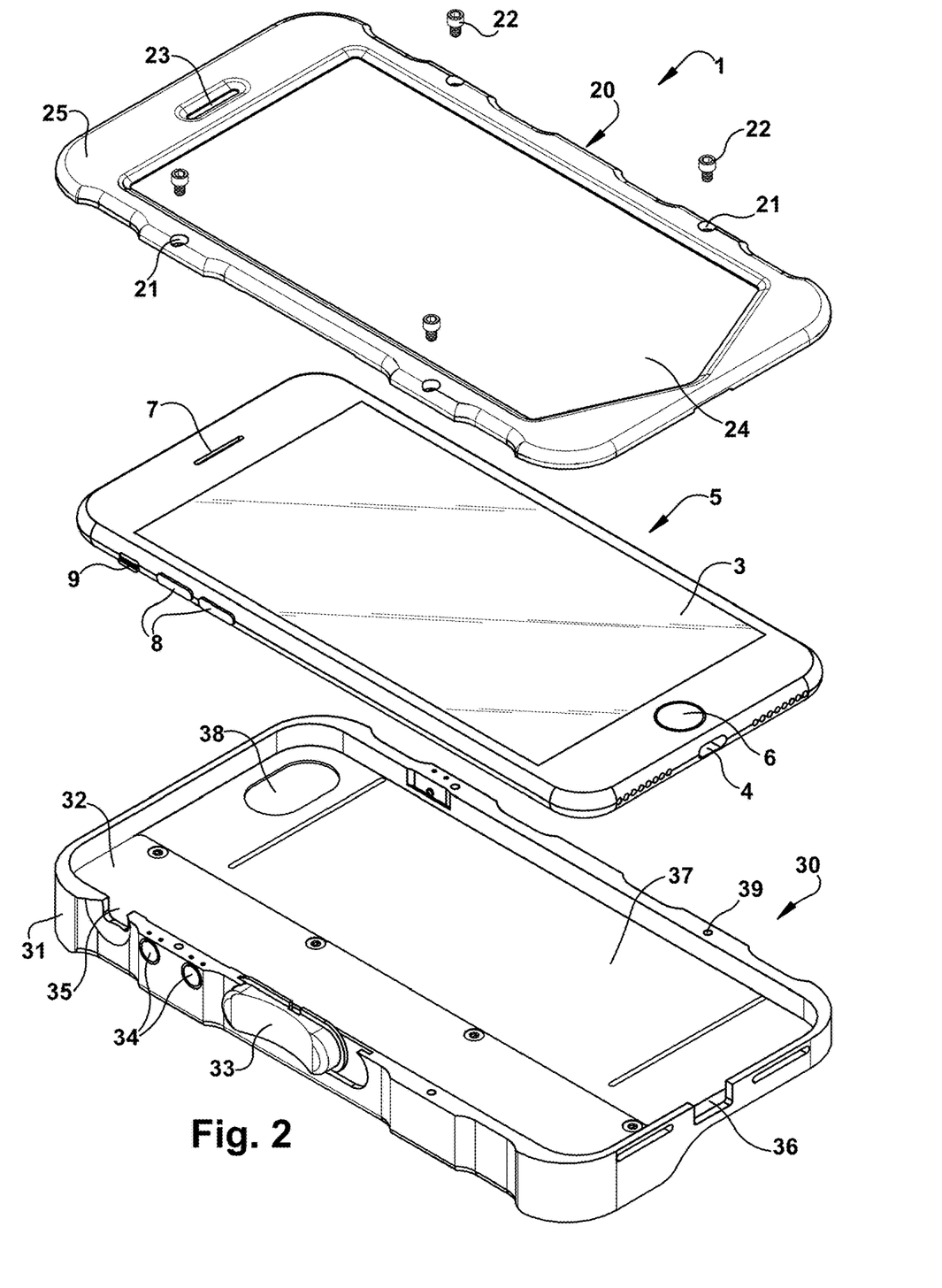
FIG. 2 is a schematic of a partially exploded view of the system of FIG. 1.

FIG. 2 is a schematic of an exploded view of the example system 1 of FIG. 1. The cell phone 5 can be any appropriate cell phone or another type of communication device, and in this example the cell phone 5 has a touch-screen 3, a camera 6, a charging port 4, a speaker 7, a power switch or port 9, and a pair of volume switches 8. Of course, other cell phone embodiments can also be utilized by other example embodiments of the example case 100. Additional access ports can be provided to access memory cards, a battery, or other cell phone ports, as desired.

FIG. 2 also shows the case 100 having a front portion 20, and a back portion 30. The front portion 20 has an opening 24 to accommodate the cell phone screen 3, and an opening 23 to accommodate the cell phone speaker 7, and a frame 25 to give the case strength and to protect the cell phone. Note that the opening 24 could be provided with a protective sheet to protect the cell phone screen but that also accommodates any touch screen operation of the cell phone. Screws 22 are provided with corresponding holes 21 to secure the front portion 20 to the back portion 30. Fasteners other than screws, such as snap tabs and recesses could be used, for example.

FIG. 2 further shows the back portion 30 having an opening 38 to accommodate a camera on the rear of the cell phone 5 (not shown). An opening 36 is provided to accommodate the cell phone charging port 4, a pair of buttons 34 are provided to accommodate the cell phone volume switches 8, and an opening 35 is provided to accommodate the cell phone port 9, whereas if item 9 is a power switch the opening 35 can be replaced with another button 34. The back portion 30 also has a back cover 37, a base 31 with walls to add strength and protect the cell phone, and a tool cover 32 to cover an enclosed tool provided in a tool receptacle (discussed in more detail below). A release switch 33 is provided to release and expose the tool, and may also be used to retract the tool.

Threaded holes 39 are provided in the back portion to receive the screws 22 to secure the front portion 20 of the case 100 to the back portion 30. Note that for ease of removal, the screws 22 and corresponding holes might be replaced with snaps or other securing structures that more easily allow the case 100 to be opened to allow for removal of the cell phone 5, such as for entry into locations where the enclosed tool might be prohibited (e.g., commercial air travel).

Figure 3:
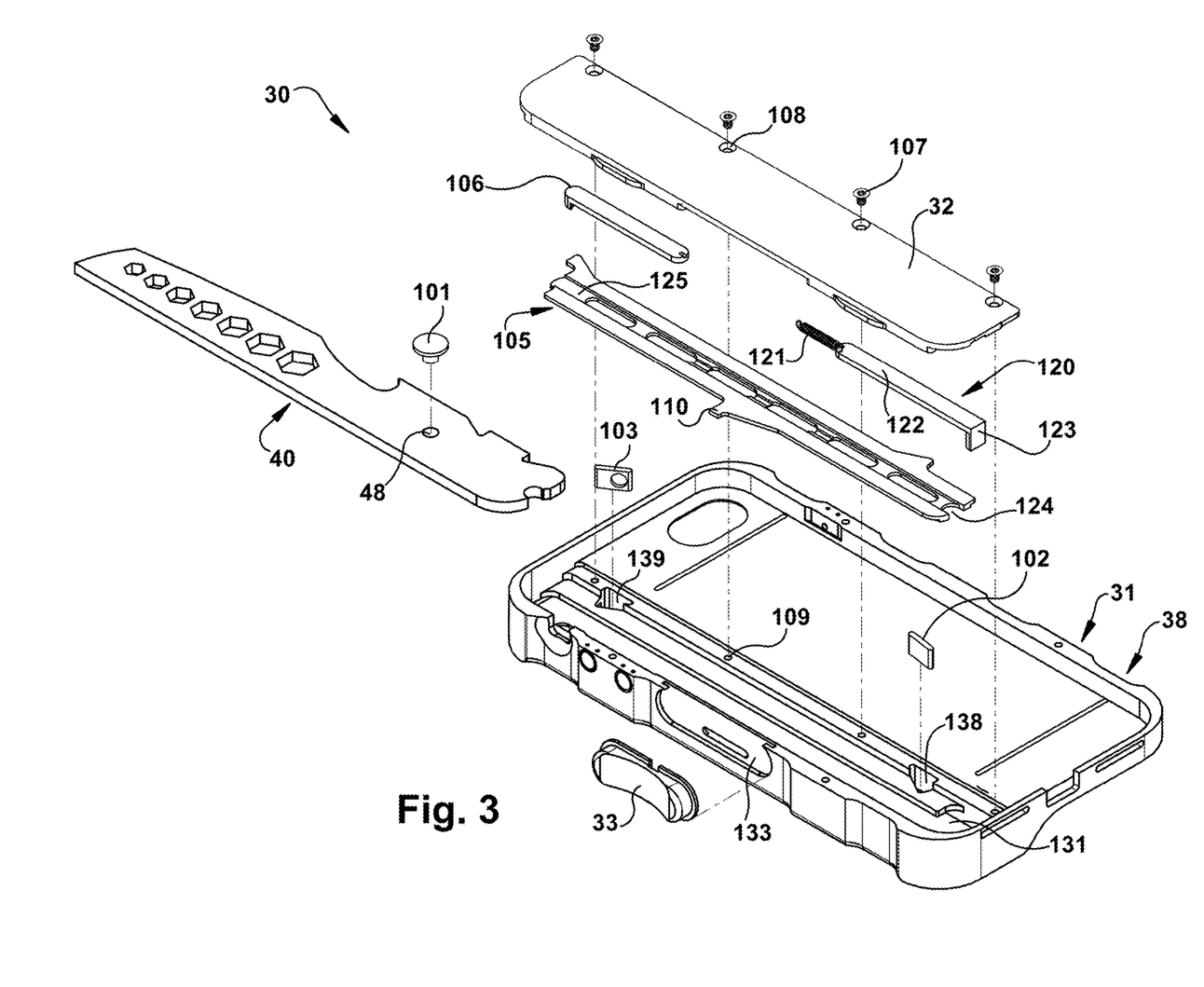
FIG. 3 is a schematic of an exploded view of an example bottom portion of the case of the system of FIG. 1 including an example tool.

FIG. 3 is a schematic that shows an exploded view of the back portion 30 of the case 100, which has a base 31 with a frame having walls 112 to provide structure and strength to the cover and to enclose the cell phone and tool. Note that as an alternative, the frame of the front portion could instead be provided with the walls 112.

The tool cover 32 is shown having holes 108 are provided to accommodate screws 107 that are secured to the base 31 using associated threaded holes 109. The tool cover 32 covers the example tool 40, and tool deployment hardware including the spring rod 120, rail 105, and bar 106 which are all provided in a receptacle portion of the base 31. Release switch 33 is configured to connect to base 31 at switch receptacle 133.

Figure 7:
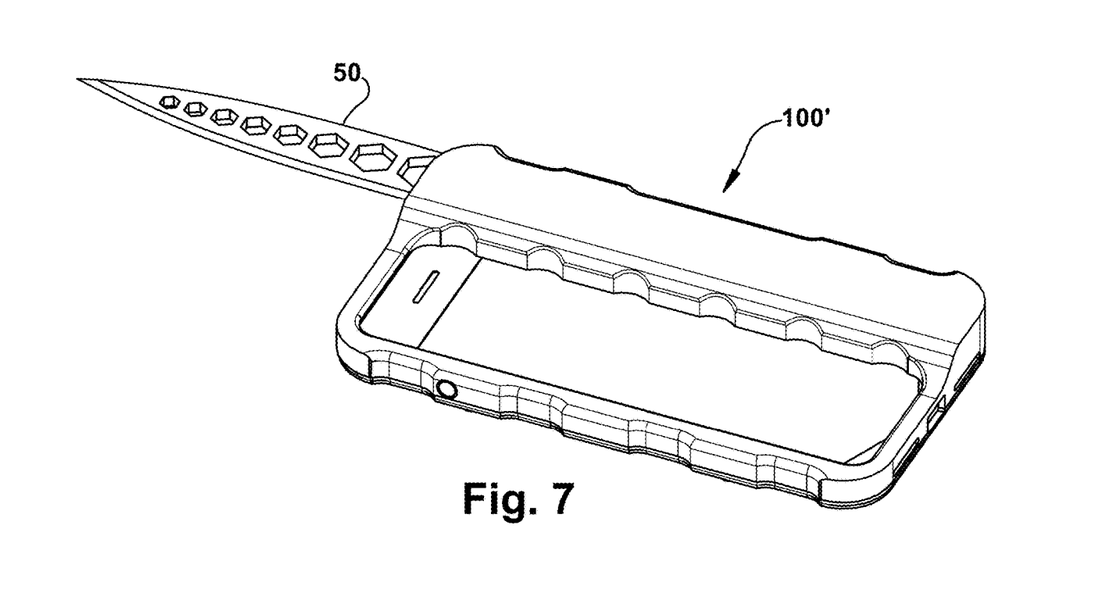
FIG. 7 shows an alternative example case with the example tool of FIG. 6B deployed.
Figure 8:
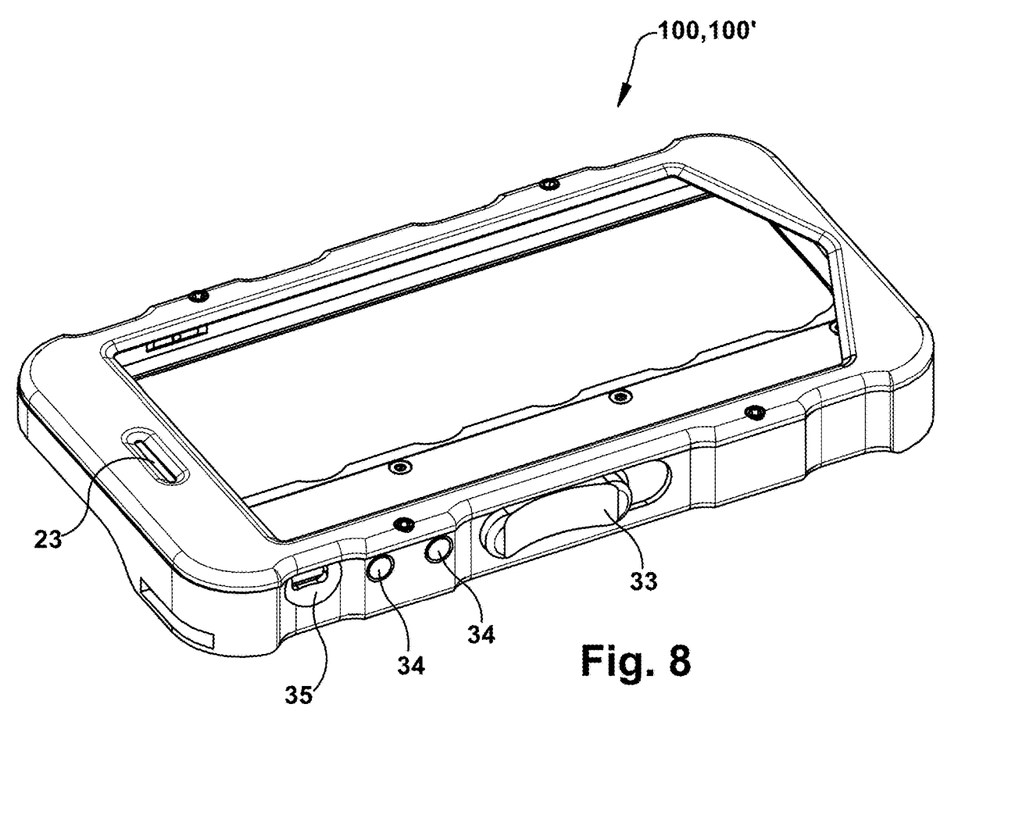
FIG. 8 shows the alternative example assembled case of FIG. 7 without a cell phone installed and with the tool retracted.

The tool deployment hardware includes the spring rod 120 comprised of a spring 121 and a spring base 122 having a tab 123 which are installed in a slot 125 in the rail 105 at a rear location of the slot 125, with the tab 123 engaging a gap portion of the rail 105. Bar 106 is installed at a front portion of the slot 125. The rail 105 has a tab 110 which engages the release switch 33. A pair of holes 138, 139 receive respective tabs 102, 103, which engage portions of the rail 105. The tool 40 is provided with a hole 48 to receive the fastener 101 to connect the tool 40 to the rail 105. Note that the deployment hardware components are provided with additional structure as shown in the drawings that cooperate for the assembly and operation of the tool as part of the assembled case 100 (or 100' as shown in FIGS. 7 & 8). Additional structure not shown may also be provided.

When assembled, in this example embodiment the back portion 30 encloses the tool 40 (or an alternative tool) in a manner where the device operates as a double-action switch blade device, with the release switch operating to extend and retract the tool 40 using the spring 121 providing the compression and tension to automatically extend and retract the tool 40. The details of this operation are not provided, as the operation of double action switch blades is known in the art, such as the switchblades provided by Microtech Knives, Inc. Alternative solutions using more than one spring, or providing a single-action device or other types of operation can also be supported. Additional structure for more easily retracting the tool or providing additional force might also be provided. Notice that various indentations may be provided on the outside of the walls 112 of the case for ease of holding and operating the device.

FIG. 4 is a schematic view of a portion of a top view of the back portion 30 showing the structure used to provide the buttons 34 in a side wall 112 of the case 100, including a button tab 191 along with washer springs 192, 193, and 194 that allow the button to operate as a substitute to direction manipulation of the control buttons already provided on the cell phone. The washer springs 192, 193, and 194 cooperate with the button tab 191 to provide such operation.

FIG. 5 is a schematic view of the base 31 without much of the tool deployment hardware or tool installed, showing various features described above regarding FIG. 4 in more detail. In particular, the tool receptacle 131 includes structure and slots for accommodating the tool deployment hardware components for operating the tool (e.g., deployment and retraction), and also may include one or more slots for accommodating one or more antennas for the phone. Alternatively, an antenna might be provided external to the case, or extendible from the case. Adding an antenna may help overcome any attenuation issues caused by the structure of the case itself. Also, the antenna function might be incorporated in the tool itself, or otherwise be deployable.

FIGS. 6A and 6B show alternative tools 40, 50 that can be used in the case 100. A wrench tool 40 provided with a plurality of wrench slots 45 of various sizes to accommodate nuts or bolts of different standard sizes is provided. The tool may have a blunt end 44 that might act as a screwdriver or wedge (or if sharpened as a knife), a bottle opener structure 42 to remove caps from bottles, and various other structures 43, 47 to support assembly and operation. The body 41 could be comprised of a strong material, such as stainless steel or surgical steel, for example, or a hardened aluminum or other strong material such as a composite or ceramic material, or combinations thereof, to support the function(s) of the tool. The edge 46 may be provided blunt, or sharpened as a knife.

As an alternative tool, blade 50 is provided with a sharp tip 50 and sharpened blade end 56. This blade 50 can also be provided with wrench slots 55, and structures 57, 53 to enable assembly, and the body 51 will likewise be constructed of a strong material such as stainless steel or surgical steel, for example, or a hardened aluminum or other strong material such as a composite or ceramic material, or combinations thereof. Use of the tool 50 effectively turns the case into a potential defensive weapon like a switch blade. In another embodiment, such as described hereinbelow, the tool is a firearm.

FIG. 7 shows another example assembled case 100" showing blade 50 in an extended (deployed) position without a cell phone installed, with slot 23" for a cell phone speaker, and where a large opening 38" is provided in the back portion for exposing any camera or for battery access of the cell phone when installed. FIG. 8 shows the assembled second example case 100" without an installed cell phone and with the tool retracted through tool exit slot 150 (and hence not shown). This second example case can use similar tool deployment hardware as described above (see FIG. 3) for the first example case.

The primary components of any example case, including the front portion 20 and the base 31, can be comprised of a number of different lightweight materials, such as aluminum, aluminum alloy (e.g., including magnesium), titanium, composite materials, or even plastics. However, stronger materials such as lightweight metals or metal alloys are preferred. In some cases, to maximize strength, a heavier metal such as stainless steel or a painted steel may be used. Decorative panels (that might be made of a plastic material or cloth, for example) might be provided over the basic stronger case to further customize the design.

Note that the case can be constructed of a material that shields the user from electromagnetic fields of the phone. Aluminum or steel cases would provide such shielding. In addition, the ports for the speaker can be designed to help direct the speaker output to the user, effectively amplifying the sound like a megaphone.

The tool can be constructed of titanium, surgical steel, stainless steel, or alloys thereof, with strength and durability at a premium. The device will be modular in that various components can be swapped out for different sized components in order to accommodate different models of cell phones, and various decorative panels can be provided, or the case may be painted in different colors or styles. Furthermore, one or more magnets can be provided along with slots to hold certain tools, such as hex wrenches, screw drivers, etc.

Furthermore, similar cases can be provided to accommodate other types of communication devices, such as walkie-talkies, satellite phones, home phones, cameras, etc. by adjusting the sizes and locations of the various features to accommodate the particular communication device.

The case can also be configured to be easily disassembled, so that the phone can be easily removed from the case, or where the tool portion may be removable. For example, rather than using the screws 22 as shown in FIG. 2 to hold the case together, snap connectors, tabs, or clips might be used so that the case can be separated and the phone removed without the use of any tools, such as are currently found on some cell phone cases. Alternatively, other types of connectors could be used that are easily manipulated without tools, such as Velcro, magnets, latches, etc. In particular, the use of strong magnets might be a viable option for holding parts together.

Or a removable hex (allen) wrench can be provided with the phone for use with hex screws for disassembling the case. In such a case, the holes in the front portion of the device might also be threaded to hold the screws in place when partially removed to disassemble the case to avoid losing the screws.

As an alternative, the case may be designed such that the phone can slide out of a slot on a side of the device, with the slot be covered or otherwise closed during normal use to avoid the phone sliding out inadvertently.

Furthermore, as suggested above, the tool (e.g., tool 40, 50 in FIGS. 6A & 6B) may be replaceable with other tools (e.g., each other, or additional tools such as a comb, wrench, scissors, nail file, screw driver, etc.) For example, the case might be sold with a comb tool, but the owner may be able to replace the comb tool with a tool such as shown in the example embodiments of FIG. 6A or FIG. 6B, for example. The firearm feature described below might also be provided as an add-on.

Figure 9A:
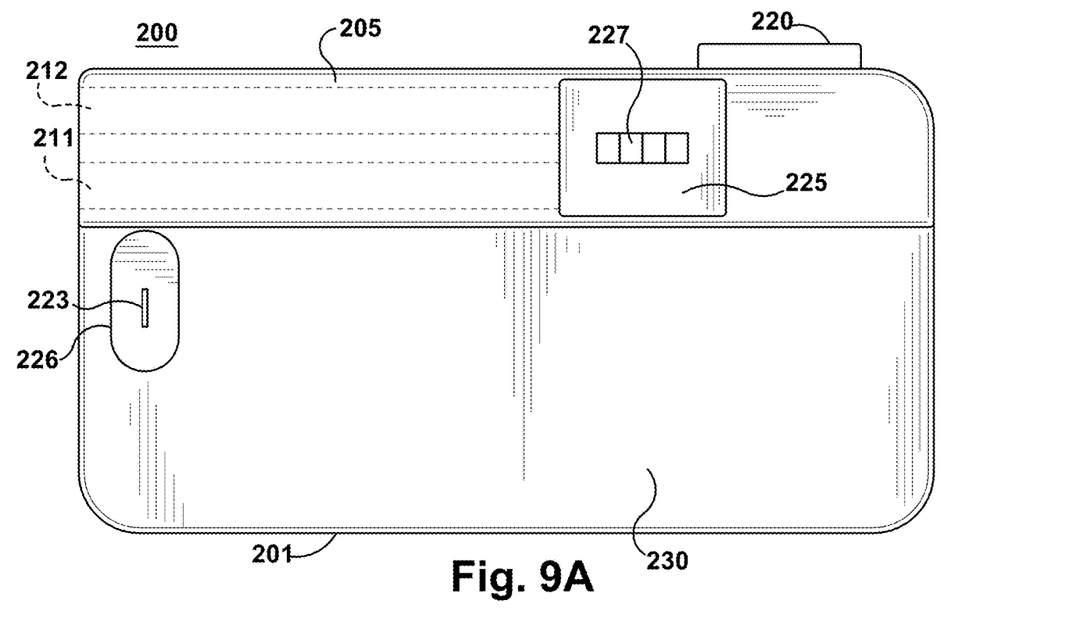
FIGS. 9A and 9B show an alternative example embodiment of a cell phone case where the tool is an operating firearm.
Figure 9B:
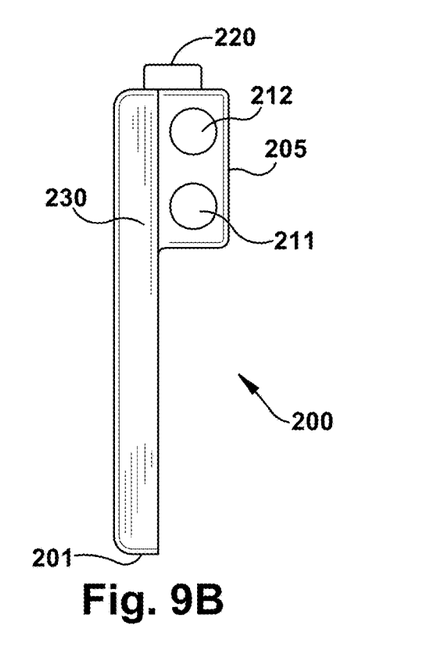

Alternatively, FIGS. 9A and 9B show a back and top side view, respectively, of another example embodiment 200 where a cell phone case 201 incorporates a firearm 205 including a pair of barrels 211, 212 that connect to two ammunition loading chambers in access port 225 that opens using switch 227 to provide access for two rounds of ammunition, such as .22 caliber handgun or LR ammunition, or some smaller rounds such as 5.7×28 rounds, 17 caliber rounds, or any of a number of different rounds of ammunition.

The trigger 220 could be operated in a manner as a switch such that pushing it in one direction fires one chamber, and pushing it in the opposite direction fires the other round, or the trigger may be designed to fire one chamber upon first activation and the other chamber upon second activation. Loading the ammunition into the access port 225 could then set the firing pins within the device in a firing position, or alternatively an alternative means of cocking the device for firing could be provided, such as by pushing the entire barrel in one or the other directions, or by putting the trigger 220 into a desired position. Note that a safety switch (not shown)

could be provided separately, or as part of the trigger 220. Alternatively, 220 could be designed as using a hammer as in a revolver where it may be pushed in one direction to cock the hammer and another direction to fire the firearm. Pushing the trigger twice might fire alternate barrels of the device. Alternatively, as separate trigger might be used for each chamber. Alternatively, a push button could be used as the trigger. Alternatively, the gun might be cocked by sliding the device downward or upward on the case like operating a semi-automatic by cocking the action by racking a slide.

A cell phone could be slid under the firearm 205 portion into the cavity 230 for receiving the phone, or the firearm 205 might be removable to allow installation of the phone. Speaker port 223 is provided, and the back can be open to accommodate a camera or other ports, or a back cover could be provided appropriate to the particular phone. A front camera port can also be provided, as can a microphone port at the opposite end, if needed. Note that the firearm 205 can be made adaptable to install on various embodiments of the rest of the case 201 for accommodating various phone models. The firearm portion 205 might be made removable from the rest of the case, such as for during travel where a weapon might be prohibited.

Figure 11A:
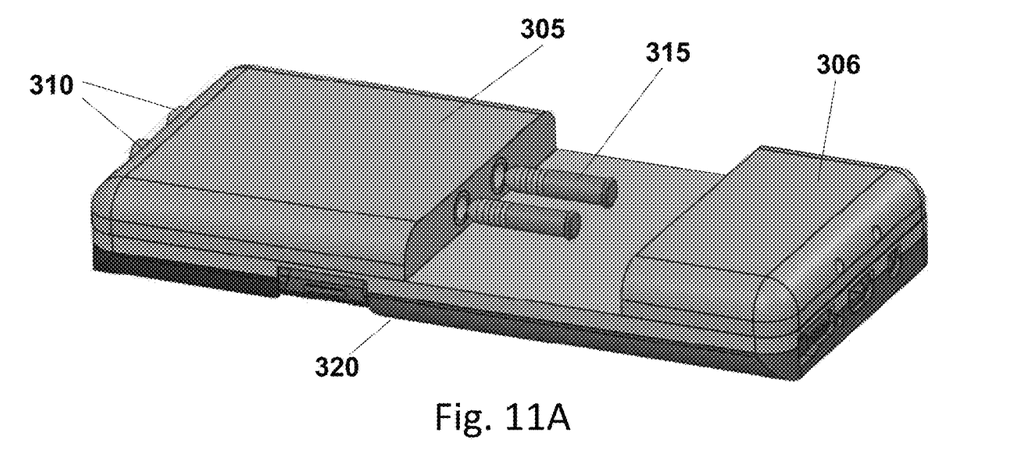
FIGS. 11A and 11B show another example embodiment of the cell phone case where the tool is an operating firearm.
Figure 11B:
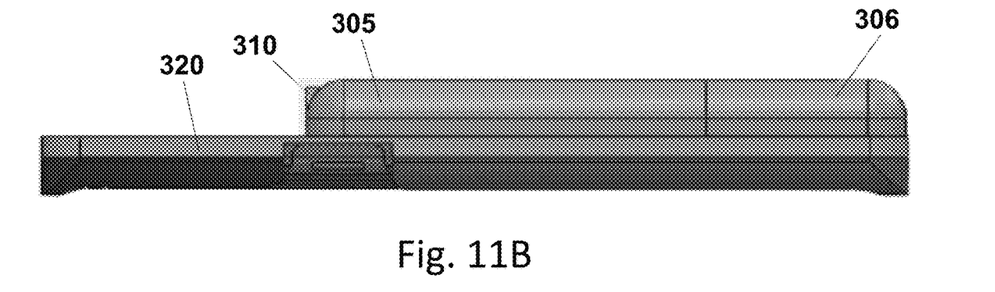
Figure 12:
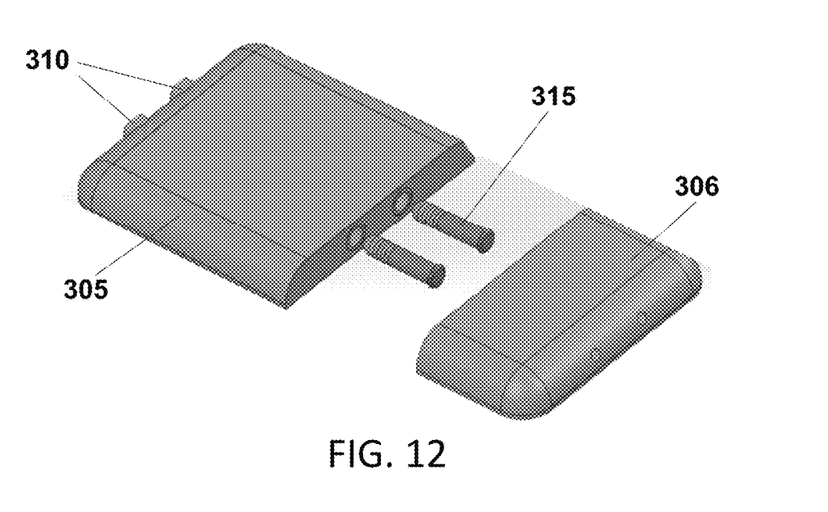
FIG. 12 shows the firearm portion of the case of FIGS. 11A & 11B.

FIGS. 11A and 11B show another example phone case 320 where there is a top firearm portion 305 having a pair of barrels 310 and a bottom firearm portion 306 that would contain the firing pins and hammer or trigger mechanisms for firing cartridges 315. FIG. 12 shows the top firearm portion 305 and the bottom firearm portion 306 as separate components. As shown in FIG. 11B, when the top portion 305 is slid down, the firearm is cocked for firing, or the bottom portion 306 could be slit up.

As discussed above, any of these cases could be made out of any light weight material composite, scandium, titanium, aluminum, etc. The barrels and gun portion could be provided on the back portion as shown in FIGS. 9A and 9B, or FIGS. 11A and 11B, or one barrel could be provided on each side of the case, or the barrels might be provided horizontally rather than vertically as shown in the figures. The barrels could be sleeved with a stronger material, for example composite sleeved with a titanium or stainless barrel, or the barrels could be machined from a solid portion of strong material, which can be a metal, or even a composite or ceramic material. Any of the case designs described above could be utilized where the tool containing portions are basically replaced with the firearm 205.

The firearm could be adapted using a larger form for up to 0.45 or .410 caliber shot. The phone could be single shot with one or more barrels, with two barrels being the most practical. The firearm could be designed to be a semi automatic device with one or more barrels and holding a number of rounds, especially of smaller caliber ammunition. The maximum number of barrels in .22 long rifle ammunition appear to be four on current cell phone sizes. Alternative approaches include the use of pellets, BBs, or non-lethal rounds that might be powered using gunpowder cartridges or compressed air.

Rounds could feed like a 10/22 or lever action rifle. The device could be designed to fire one round or 2 or more barrels at once. In some designs, the barrels of the firearm might be retracted into a chamber or under a cover and that are deployed upon activation of a switch to expose the barrels.

The device could be provided to have an integral laser sight for pointing, or it might use the camera feature or another application on the phone for aiming and even firing the gun. The device could be adapted to trigger the firearm remotely from another device by using a trigger activated by solenoid or motor or other automated firing design. The phone could be provided with one or more safeties to prevent accidental discharge, or the device might be provided with a manually activated hammer to operate similar to a revolver, as described above.

The firearm should be designed for easy assembly and disassembly for cleaning and/or installing the phone into the case. As described above, the phone can be installed in the case by either slipping the phone into the case, or assembling the case around the phone, such as by installing the firearm after the phone is installed in a portion of the case.

Figure 10A:
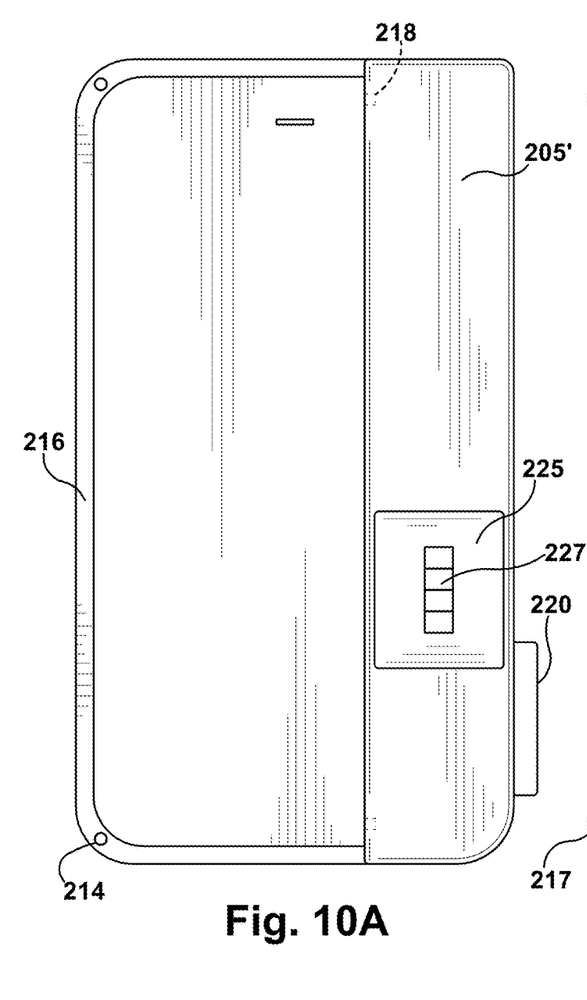
FIGS. 10A and 10B show a modification of the case of FIGS. 9A, 9B by adding a removable back portion.
Figure 10B:
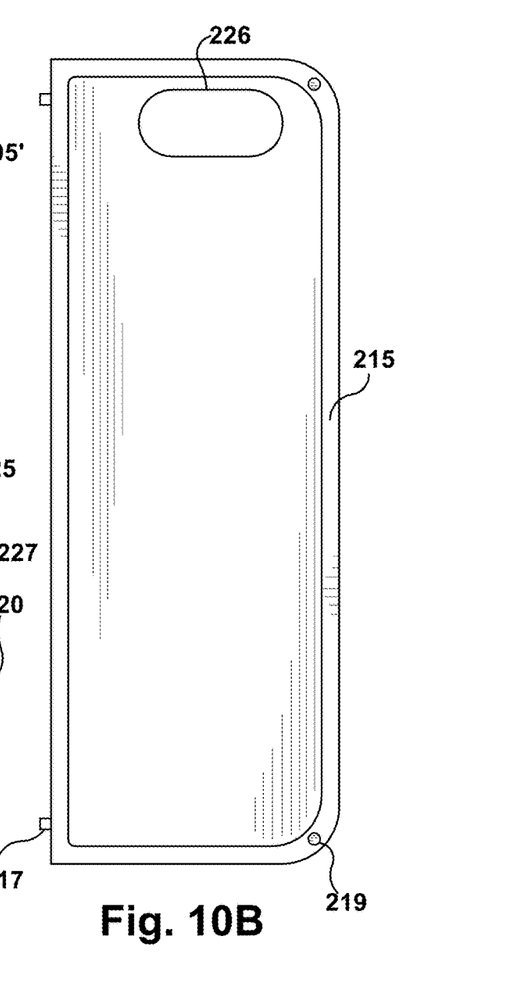

The case might also be provided in parts that can be assembled around the phone, such as front/back snap on pieces. FIGS. 10A, 10B show one such approach, where a removable back cover 215 is provided with tabs 217, 219 that fit into receptacles 218, 214 respectively in a snap-in manner along a rim 216 for a case with firearm 205'. A camera port 226 is also provided. For such a device, the cell phone may slide under firearm 205' or the firearm may be installed subsequently. Since the device might be used as a weapon, assembly using alternative fasteners such as screws might be utilized to ensure a more robust, durable case. Note that rather than a back cover, use of a peripheral frame with an open back could also be used (in which case no camera port is needed).

If the case is designed for receiving the phone by sliding the phone into an interior chamber of the case, then a frame or other component of the case would be snapped or otherwise fastened into place to secure the phone within the case.

Note that although it is contemplated that the case of the example embodiments will be provided as an after-market device that can be installed with a separately purchased communication device, the case might be sold in conjunction with the communication device as an integrated package.

Furthermore, additional tools that could be provided in the case include any combination of: USB drive, cigarette lighter, pen, toothpick, nail file, medicine holder, secure deployable compartment, magnifying glass, fiber optic wand, mirror, nail clipper, insulin dispenser with needle, blood sugar detector, antenna, smoke screen, tape measure, stethoscope, ophthalmoscope, hammer, EKG or other device electrodes; otoscope, wire stripper, tweezers, crescent wrench, level, putty knife, square, among others.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A case for a communication device, comprising:
   a weapon;
   deployment structure configured to activate the weapon;

a front portion comprising an opening to access a screen of the communication device, said front portion having a peripheral frame around said opening and at least one opening to accommodate a speaker in the communication device;

a back portion including a portion configured to receive said weapon and said deployment structure, wherein said case is configured to securely hold said communication device within said case.

2. The case of claim 1, wherein said weapon includes a sharpened blade that is retractable within a containment structure such that said blade is deployed by activation of said deployment structure.

3. The case of claim 2, wherein said deployment structure includes a switch that is configured to retract said blade from said case upon activation of said switch.

4. The case of claim 1, wherein said weapon comprises a firearm having at least one barrel and a chamber for receiving at least one round of ammunition, such that activation of said deployment structure fires said ammunition.

5. The case of claim 4, wherein said firearm has at least two barrels each of which can be chambered with at least one round of ammunition.

6. The case of claim 1, wherein said communication device is a cell phone and wherein said opening in said front portion exposes a screen of said cell phone.

7. The case of claim 6, further comprising a plurality of buttons on a side of said case each configured to actuate a different corresponding input device on said cell phone.

8. The case of claim 1, wherein said front portion and said back portion are configured to be disassembled for removal of said communication device without using any tool.

9. The case of claim 1, wherein said back portion includes an opening to accommodate a camera on a back of said communication device.

10. A method of assembling a communication device within a case, comprising the case of claim 1 and including the steps of:

placing the communication device within an interior space of said case; and securing the communication device within the case.

11. The case of claim 1, wherein said case includes a component that is configured to secure said communication device within said case.

12. The case of claim 11, wherein said case includes a component that is configured to secure said communication device within said case.

13. The case of claim 11, wherein said firearm has at least two barrels.

14. The case of claim 11, wherein said firearm includes a chamber for holding at least two rounds of ammunition.

15. The case of claim 11, wherein said firearm can be disassembled from said case.

16. The case of claim 11, wherein said firearm is configured having at least one barrel and a chamber for receiving said bullet as part of a round of ammunition, such that activation of said trigger fires said bullet from said firearm.

17. The case of claim 11, wherein said firearm is configured having at least one barrel and a chamber for receiving said bullet.

18. The case of claim 17, wherein said bullet is expelled from said firearm by use of compressed air or a separate gunpowder cartridge.

19. A case for a communication device, comprising:

a firearm including a deployment structure having a trigger configured to fire a bullet from the firearm;

a front portion comprising an opening to access a screen of the communication device, said front portion having a peripheral frame around said opening and at least one opening to accommodate a speaker in the communication device; and a back portion including a portion configured to receive said firearm, wherein said case is configured to securely hold said communication device within said case.

20. A method of assembling a communication device within a case, comprising the steps of:

providing a case including:

a firearm including at least one barrel, a chamber for receiving at least one round of ammunition, and a deployment structure having a trigger configured to fire a bullet from the firearm, a front portion comprising an opening to access a screen of the communication device, said front portion having a peripheral frame around said opening and at least one opening to accommodate a speaker in the communication device, and a back portion including a portion configured to receive said firearm, wherein said case is configured to securely hold said communication device within said case;

placing the communication device within an interior space of said case; and securing the communication device within the case.

* * * * *